(No Model)

D. LYNN.
DOVETAILING MACHINE.

No. 583,383. Patented May 25, 1897.

Witnesses
J. G. Hinkel
J. E. Hutchinson Jr.

Inventor,
David Lynn
By Burton Macafee
his Attorney

UNITED STATES PATENT OFFICE.

DAVID LYNN, OF ATHENS, PENNSYLVANIA.

DOVETAILING-MACHINE.

SPECIFICATION forming part of Letters Patent No. 583,383, dated May 25, 1897.

Application filed October 7, 1896. Serial No. 608,120. (No model.)

*To all whom it may concern:*

Be it known that I, DAVID LYNN, a citizen of the United States, residing at Athens, in the county of Bradford and State of Pennsylvania, have invented certain new and useful Improvements in Dovetailing-Machines, of which the following is a specification.

In the manufacture of certain articles of furniture it is desirable that the panels, boards, or flat pieces of wood which constitute the stock that is used should have dovetail grooves cut in their faces in order to facilitate the joining of the parts from which the article being made in constituted. It is necessary that the number of grooves in the different pieces of stock should vary, and also that the distances between adjacent grooves should vary, as is apparent to those skilled in manufacturing furniture.

It is the object of my invention to produce a machine for cutting dovetail grooves across the face of a piece of board or other stock which may be presented to it, and by means of which machine the number of such grooves being cut simultaneously, as well as their relation to each other, may be easily varied as required. With this object in view the invention consists of a dovetailing-machine of novel construction and arrangement and combination of parts, as will be hereinafter pointed out.

In order that my invention may be the better understood, I have in the accompanying drawings illustrated the preferred form thereof, without, however, thereby intending to limit my invention in its useful applications to the particular embodiment thereof which I have delineated.

Figure 1:
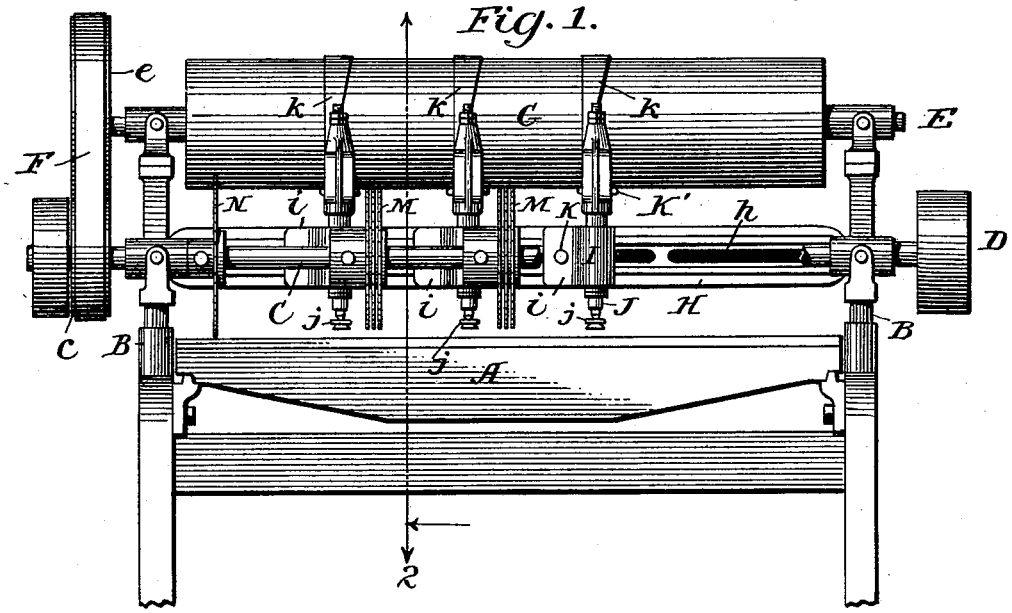
Figure 2:
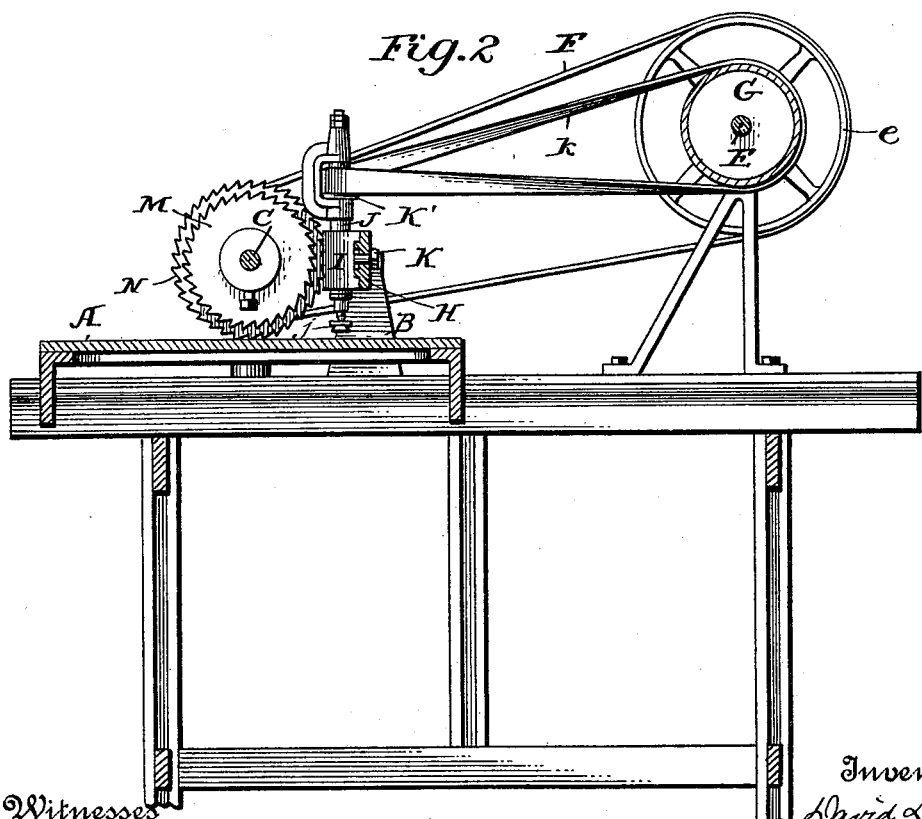

In such drawings, Figure 1 is a front view of a machine embodying my invention, part of the main arbor or shaft being broken away. Fig. 2 is a vertical section taken on the line 2 2 of Fig. 1.

In the drawings, A represents a table, suitably supported, upon which the material to be operated upon is placed. This table is of a size to suit the kind of work for which the machine is adapted and is provided with guides, clamps, and the like for holding the work, but as these parts form no part of my invention they are neither shown nor described in detail. At the ends of the table are brackets or standards B B, in which are mounted the principal driving and supporting parts of the machine.

C represents an arbor suitably supported at the front side of the machine above the table A and provided with a drive-pulley D, adapted to receive a belt from any suitable source of power. At the opposite side of the machine there is a shaft E, provided with a pulley *e*, which is connected by a belt F with a pulley *c* on the arbor C. This shaft carries a drum G, which extends practically across the table A and is preferably of uniform size from end to end, so that it will drive a belt equally well whatever the position to which the latter may be adjusted thereupon.

H represents a cross-bar supported by the brackets B and arranged between the arbor C and the drum G and parallel to the latter. It serves as a support for the bearings I, in which are mounted the spindles J, that carry the tools *j*, which cut the dovetail grooves in the stock being operated upon.

The cross-bar is preferably slotted, as at *h*, and a bolt K, passing through this slot and a plate *i*, carried by the bearing I, serves to secure the latter to the supporting-bar and at the same time constitutes means for adjusting the bearing and its tool transversely across the table A. There are as many of these bearings and tools supported upon the bar H as there are grooves to be cut, and their arrangement will determine the position of the grooves with relation to each other and to the edges of the stock. Each spindle is provided with a band-pulley K', and belts *k* connect the pulleys with the drum G, so that no matter what number of dovetailing-tools be employed at any one time, or what their position with relation to each other, they will all be driven from the one drum G.

Upon the arbor C there are mounted a number of saws M, which are adjustable longitudinally upon the arbor and are intended to cut out channels or grooves in the stock on the lines which the tools *j* are to follow in order to lessen the work of the latter.

N are cut-off saws also mounted upon the arbor C and operating, when brought into use, to trim the edges of the stock.

The operation of the machine may now be stated. As many bearings I, carrying the dovetailing-tools, are secured to the supporting cross-bar H as there are grooves to be cut, and they are accurately adjusted upon their support to correspond with the positions of the grooves they are to form. The connection of the driving-belts for the several tools with a drum of uniform size throughout renders this adjustment easy without severing the driving-belt, each driving connection being thus independently and easily adjustable without disturbing its tension. It is evident that the drum G need not be continuous from end to end, as a series of comparatively broad-faced pulleys, arranged side by side upon the shaft E, would be the equivalent in operation of a drum with a continuous face.

The saws M are adjusted so that each one—or each nest of saws when several are used together—is directly in front of one of the tools $j$, and the saws N are properly adjusted or moved to the ends of the arbor if they are not required. The machine being in motion, the piece of stock which is to be grooved is placed flatwise upon the table and moved backward toward the tools, being directed by suitable guides. The saws M first cut straight-sided channels, and immediately after them follow the dovetailing-tools which finish the grooves.

The particular kind of tool $j$ which is used is immaterial so far as my present invention is concerned.

What I claim is—

In a dovetailing-machine, the combination of the supporting-table A, over which the stock is moved, a transversely-arranged supporting-bar above the table, a series of groove-cutting tools supported by the said bar, and each independently adjustable thereon from end to end, means for securing each tool in place on the bar after it has been adjusted, an arbor C parallel with the supporting-bar, a series of kerf-cutting saws, each independently adjustable upon the said arbor from end to end, the said bar and arbor being so situated relative to each other that the saws are in front of but close to the groove-cutting tools, a drum G and independent driving-belts between the drum and the said tools, adjustable along the said drum, substantially as set forth.

DAVID LYNN.

Witnesses:
J. B. MAURY,
JOSEPH M. ELY.